(12) United States Patent
Guevara (10) Patent No.: US 7,114,628 B2
(45) Date of Patent: Oct. 3, 2006

(54) BOTTLE HOLDING APPLIANCE AND METHOD FOR ITS USE

(76) Inventor: Elizabeth Ann Guevara, 300 Carlsbad Village Dr., #108A-152, Carlsbad, CA (US) 92008

( * ) Notice: Subject to any disclaimer, the term of this patent is extended or adjusted under 35 U.S.C. 154(b) by 121 days.

(21) Appl. No.: 10/992,064

(22) Filed: Nov. 18, 2004

(65) Prior Publication Data

US 2006/0070969 A1    Apr. 6, 2006

Related U.S. Application Data

(63) Continuation-in-part of application No. 10/959,478, filed on Oct. 6, 2004.

(51) Int. Cl.
*B65D 25/00* (2006.01)
*B65D 51/00* (2006.01)

(52) U.S. Cl. .................. 220/287; 220/287; 220/739

(58) Field of Classification Search ............ 220/329, 220/330, 331, 737, 255, 334, 287, 254.8, 220/288, 289, 780, 709, 739, 740, 495.03
See application file for complete search history.

(56) References Cited

U.S. PATENT DOCUMENTS

| | | | | |
|---|---|---|---|---|
| 2,365,178 | A * | 12/1944 | Dodson | ................. 220/214 |
| 4,932,544 | A | 6/1990 | Glazer | |
| 5,044,512 | A | 9/1991 | Giancaspro et al. | |
| 5,056,676 | A | 10/1991 | Allen | |
| 5,826,748 | A | 10/1998 | Qian et al. | |
| 6,095,382 | A * | 8/2000 | Gross | ................. 222/520 |
| 6,550,271 | B1 | 4/2003 | Silbert | |
| 6,637,321 | B1 | 10/2003 | Wang | |
| 2003/0209547 | A1 * | 11/2003 | Lin | ................. 220/254.8 |
| 2004/0035869 | A1 * | 2/2004 | Laurent | ................. 220/259.3 |

* cited by examiner

*Primary Examiner*—Jes F. Pascua
*Assistant Examiner*—Shawn Braden
(74) *Attorney, Agent, or Firm*—Kenneth P. Krohn (57) ABSTRACT

The present invention is generally comprised of an appliance for holding a bottle (or other object having a threaded opening) and a method of using the appliance. The appliance is generally comprised of a cap member that is removably connected to a container member. In some embodiments of the invention, the cap member has a cylindrical portion adjacent to an opening in the cap member, such cylindrical portion being threaded on its interior surface. In such embodiments, the container member also has a cylindrical portion adjacent to an opening in the container member, such cylindrical portion being threaded on its exterior surface. In such embodiments, the cap member is screwed onto the container member by means of the threads. In other embodiments, the cap member is also comprised of an adjustable connector portion to receive threads on the cylindrical portion of the bottle adjacent to bottle opening. The adjustable connector provides the capability to adapt the cap member to different sizes of bottle openings and thread designs on such openings, so that a single cap member may be used to hold multiple bottles or other apparatus with different sizes of openings and thread designs. In still other embodiments, the appliance is comprised of a tubular member that extends from an area outside the appliance through the opening in the cap member and the opening in the bottle to the interior volume of the bottle, so that the volume within the bottle is in fluidic communication with such outside area. In yet other embodiments, the appliance is also comprised of the bottle. Finally, the invention also includes a method for using an embodiment of the appliance.

28 Claims, 4 Drawing Sheets

BOTTLE HOLDING APPLIANCE AND METHOD FOR ITS USE

CROSS REFERENCES TO OTHER APPLICATIONS

This application is a continuation-in-part application of U.S. patent application Ser. No. 10/959,478, filed on Oct. 6, 2004, the full disclosure of which is incorporated herein by reference.

BACKGROUND

The present invention generally relates to an appliance that holds a container or other object having a threaded opening and a method of using the appliance, and more specifically, to an appliance that holds a bottle or other object having a threaded opening and a method of using such appliance.

There currently exist in the relevant art devices that are used to hold liquids. In addition, there are devices currently known in the art that hold other containers with the function of maintaining the temperature of liquids held in the containers. For example, there are foam-insulated devices that fit tightly against the sides and bottom of a 12 ounce can of soda in order to keep the soda cold until consumed. There are also "coaster" type devices known in the art. These devices are placed under a container holding a cold liquid in order to keep condensate from running from the container onto the surface on which the coaster and container are placed. In addition, there are devices known in the art that may be used to cool the temperature of a liquid held in a container. For example, an ice chest may hold ice and containers of liquid in a manner so that the ice in the ice chest cools the liquid in the containers placed in the ice chest.

U.S. patent application Ser. No. 10/959,478, filed on Oct. 6, 2004, which is the parent application of this present continuation-in-part application, discloses a first version of a single appliance that may be used to accomplish all of these purposes by providing convenience and flexibility for the user of the appliance. For example, the user is only required to have one appliance available to accomplish these purposes, rather than multiple devices. Similarly, the appliance of the parent application saves the user money, in that only one device (and not multiple devices) needs to be purchased. Further, this appliance has an aesthetic appearance that may be more appealing to users. This appliance also reduces water rings that form from condensate from cold drinks, so that the appliance prevents damage to desktops, paperwork, computers and other office equipment in office settings. The appliance of the parent application does not, however, have the capability to adapt to different sizes of bottles. For example, a specific embodiment of this appliance may receive and hold bottles having an opening of a specific diameter, but may generally not receive and hold bottles that have openings with significantly greater or smaller diameters. There is therefore a need for a device similar to this appliance that provides the flexibility to receive and hold bottles that have openings with different diameters. This would provide even more convenience for the user because only one appliance, rather than multiple appliances would be required. In addition, the user would save money because only one appliance, and not multiple appliances, would need to be purchased to accomplish this purpose.

SUMMARY

The present invention is directed to a bottle holding appliance and methods of using the appliance that meet the needs discussed above in the Background section. As described in greater detail below, the present invention, when used for its intended purposes, has many advantages over other devices known in the art, as well as novel features that result in a new bottle holding appliance and methods for its use that are not anticipated, rendered obvious, suggested, or even implied by any prior art devices or methods, either alone or in any combination thereof.

One embodiment of the present invention generally discloses an appliance for holding a bottle, where the bottle has an opening therein. In this embodiment, the appliance is generally comprised of a container member, a cap member, adjustable bottle connecting means, and cap member connecting means. The container member is generally comprised of a container body having an opening at one end of the container body. The cap member is comprised of a cap body having an opening in the cap body. The adjustable bottle connecting means is used to removably connect the cap body to the bottle opening in a manner so that the opening in the cap body is in fluidic communication with the bottle opening. The cap member connecting means is used to removably connect the cap member to the container member in a manner so that the cap member covers the opening at one end of the container member and so that the bottle is positioned within the volume displaced by the container body while the cap member is removably connected to the container member.

In some embodiments of the present invention, the bottle has a cylindrical portion adjacent to the bottle opening that is threaded on its exterior surface and the adjustable bottle connecting means is an adjustable connector comprised of a tubular holding member, a tab assembly member, a top locking member, and top locking connector means to connect the top locking member to the tubular holding member. In these embodiments, the tubular holding member extends approximately perpendicular from a surface of the cap body. The tubular holding member also has at least three grooves therein extending approximately longitudinally from the end of the tubular holding member that is opposite from the cap body and at least three channels in the tubular holding member that are positioned at the end of each of the at least three grooves. In these embodiments, the tab assembly member is further comprised of a tab assembly base portion, at least three tab portions, and at least three tab holding portions. The tab assembly base portion is approximately annular in shape and has an interior diameter of a size so that the tab assembly base portion fits over and slides down the outside surface of the tubular holding member. Each of the at least three tab portions is further comprised of a bead on the interior surface thereof. In addition, each of the at least three tab portions corresponds to one of the at least three grooves and at least three channels in the tubular holding member and each of the at least three tab portions is positioned in one of the at least three channels. Each of the at least three tab holding portions corresponds to one of the at least three tab portions, and each of the at least three tab holding portions connects one of the at least three tab portions to the tab assembly base portion. Also in these embodiments, the top locking member has a surface approximately annular in shape of a size adapted to be positioned adjacent to the tab holding member. Also in these embodiments, the top locking connector means, which is described in more detail below, is used to connect the top locking member to the tubular holding member. Further, in these embodiments, the tubular holding member and the top locking member each have an interior diameter of a size capable of receiving the cylindrical portion adjacent to the opening in the bottle so that when the cylindrical portion of the bottle is screwed into the adjustable connector the threads of the exterior surface of the cylindrical portion of the bottle adjacent to the bottle opening are held in place by the tab portions.

In other embodiments of the present invention, the top locking connector means is comprised of threads on the interior surface of the tubular holding member and an annular-shaped channel recessed in the annular-shaped end surface of the top locking member. In these embodiments, the annular-shaped channel is of a size adapted to fit over the end of the tubular holding member, and the annular-shaped channel has threads on the interior circumferential surface of the annular-shaped channel that are of a size and shape adapted to receive the threads on the interior surface of the tubular holding member. In yet other embodiments of the invention, the tubular holding member has three grooves and three channels, and the tab assembly member is comprised of three tab portions and three tab holding portions. In still other embodiments of the invention, the preferred interior diameter of the tubular holding member is between ½ inches and 2½ inches, and the outside diameter of the bottle opening is between ⅜ inches and 2½ inches. In these embodiments, the more preferred interior diameter of the tubular holding member is between one inch and 1⅛ inches, and the outside diameter of the bottle opening is between ⅞ inches and 1⅛ inches.

In other embodiments of the present invention, the appliance further comprises a tubular member that extends from a position within the interior volume of the bottle through the bottle opening and the opening in the cap body to a position in an area on the side of the cap member opposite the bottle, so that the interior volume of the bottle is in fluidic communication by means of the tubular member with such area on the side of the cap member opposite the bottle. In some of these embodiments, the tubular member has a cross-section that is cylindrical in shape. In other embodiments, the appliance also comprises tubular member connector means to removably connect the tubular member to the cap member. In some of these embodiments, the tubular member also has a cross-section that is cylindrical in shape. In yet other embodiments, the tubular member connector means is comprised of the tubular member having a cross-sectional shape and size approximately the same as the shape and size of the opening in the cap body, so that the tubular member may be slideably inserted into and removed from the opening in the cap body. In such embodiments, the tubular member is held in place within the opening in the cap body by friction.

In other embodiments of the present invention, the opening at one end of the container body is approximately circular in shape and the portion of the container body adjacent to such opening is approximately cylindrical in shape. In some embodiments, the cap body is comprised of a bottom portion approximately cylindrical in shape and the cylindrical portion of the cap body is of a size adapted to fit over and be removably connected to the cylindrical portion of the container body by being positioned adjacent to the cylindrical portion of the container body. In some of these embodiments, the cap body is further comprised of a top portion approximately circular in shape that is adjacent to one end of the bottom cylindrical portion of the cap body, so that the top portion of the cap body entirely covers the opening of the container body while the cap member is removably attached to the container member. In other of these embodiments, the cap member connecting means is comprised of threads on the exterior surface of the cylindrical portion of the container body adjacent to the container body opening and threads on the interior surface of the bottom cylindrical portion of the cap body. In these embodiments, the threads on the container body are of a size and structure adapted to receive the threads on the cap body so that the cap member can be screwed onto the container member by use of such threads.

In other embodiments of the present invention, the container body is further comprised of a lower portion adjacent to the approximately cylindrical portion of the container body that is adjacent to the opening in the container body. In some of these embodiments, the lower portion extends in a direction away from the approximately cylindrical portion opposite the opening and symmetrically along a longitudinal axis that extends through the center of the cylindrical portion. In some of these embodiments, the lower portion may be constructed of a thermally insulating material. Preferably, the thermally insulating material is a light, resilient polystyrene foam (such as STYROFOAM). In other of these embodiments, the lower portion has a cross-section that is circular in shape, when viewed along the longitudinal axis of the lower portion, and such cross-section increases in diameter and then decreases in diameter as such cross-section is displaced longitudinally away from the approximately cylindrical portion of the container body. In these embodiments, the distal end of the lower portion has a bottom surface that enables the container to rest on a flat surface when placed upon such surface. In some embodiments, the preferred length of the container member along its longitudinal axis from the opening of the container body to the bottom surface of the lower portion of the container body is in the range of from seven inches to twelve inches. In yet other embodiments, the cylindrical portion of the container body adjacent to the opening of the container body preferably has an inside diameter in the range of from two inches to four and one half inches. In yet other embodiments, the inside diameter of the cross-section of the bottom portion of the container member having the maximum diameter is preferably in the range of from two inches to six inches.

In other embodiments of the present invention, the appliance is further comprised of the bottle. The present invention also includes a method of using the appliance. This method is comprised of the follow steps. First, connecting the bottle to the cap member by screwing the adjustable connector of the cap member to the threaded cylindrical portion adjacent to the bottle opening. Second, connecting the cap member to the container member by screwing the threaded cylindrical portion of the container body adjacent to the opening at one end of the container body to the threaded bottom cylindrical portion of the cap member. And finally, inserting the tubular member through the opening in the cap member and into the bottle.

As may be noted from the preceding summary, the appliance of the present invention meets the needs discussed above in the Background section. For example, the appliance can be used to hold liquids. In such cases, there is no need to have a separate bottle to hold the liquids. Also in such cases, one end of the tubular member may be inserted into the opening in the cap member until it extends into the liquid held in the container member. By applying sufficient suction to the opposite end of the tubular member (the end outside the container member), the liquid may be removed from the container. In addition, as described above, a bottle can be used to hold a liquid and the bottle can be connected to the cap member. The adjustable bottle connecting means provides the capability to adapt the cap member to different sizes of bottle openings and thread designs on such openings, so that a single appliance may be used hold multiple bottles with different sizes of openings and thread designs. In these cases, the bottle is contained within the volume displaced by the container member. In some of these cases, the container member acts to collect and contain any condensate that may develop on the surface of a bottle holding a cold liquid. This obviates the need for a coaster to prevent the condensate from reaching the surface on which the appliance is resting. In other cases, the container member can act as an insulator to keep the contents of the bottle warm or cold. In addition, it is possible to put ice or another cold medium, or hot water or another warm medium, in the container member. In these cases, the contents of the bottle are not diluted by the cold or warm medium in the container member, but the temperature of the contents can be regulated by the medium. Where a bottle is utilized, the contents of the bottle may be removed by using the tubular member in that manner described above. Thus, the appliance of the present invention provides all of the functions desired in a single device.

There has thus been outlined, rather broadly, the more primary features of the present invention. There are additional features that are also included in the various embodiments of the invention that are described hereinafter and that form the subject matter of the claims appended hereto. In this respect, it is to be understood that the invention is not limited in its application to the details of construction and to the arrangements of the components set forth in the following description or illustrated in the following drawings. This invention may be embodied in the form illustrated in the accompanying drawings, but the drawings are illustrative only and changes may be made in the specific construction illustrated and described within the scope of the appended claims. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

The foregoing summary, as well as the following description, will be better understood when read in conjunction with the appended drawings, in which.

DETAILED DESCRIPTION

Reference will now be made in detail to the preferred aspects, versions and embodiments of the present invention, examples of which are illustrated in the accompanying drawings. While the invention will be described in conjunction with the preferred aspects, versions and embodiments, it is to be noted that the aspects, versions and embodiments are not intended to limit the invention to those aspects, versions and embodiments. On the contrary, the invention is intended to cover alternatives, modifications and equivalents, which may be included within the spirit and scope of the invention as defined by the appended claims.

Figure 1:
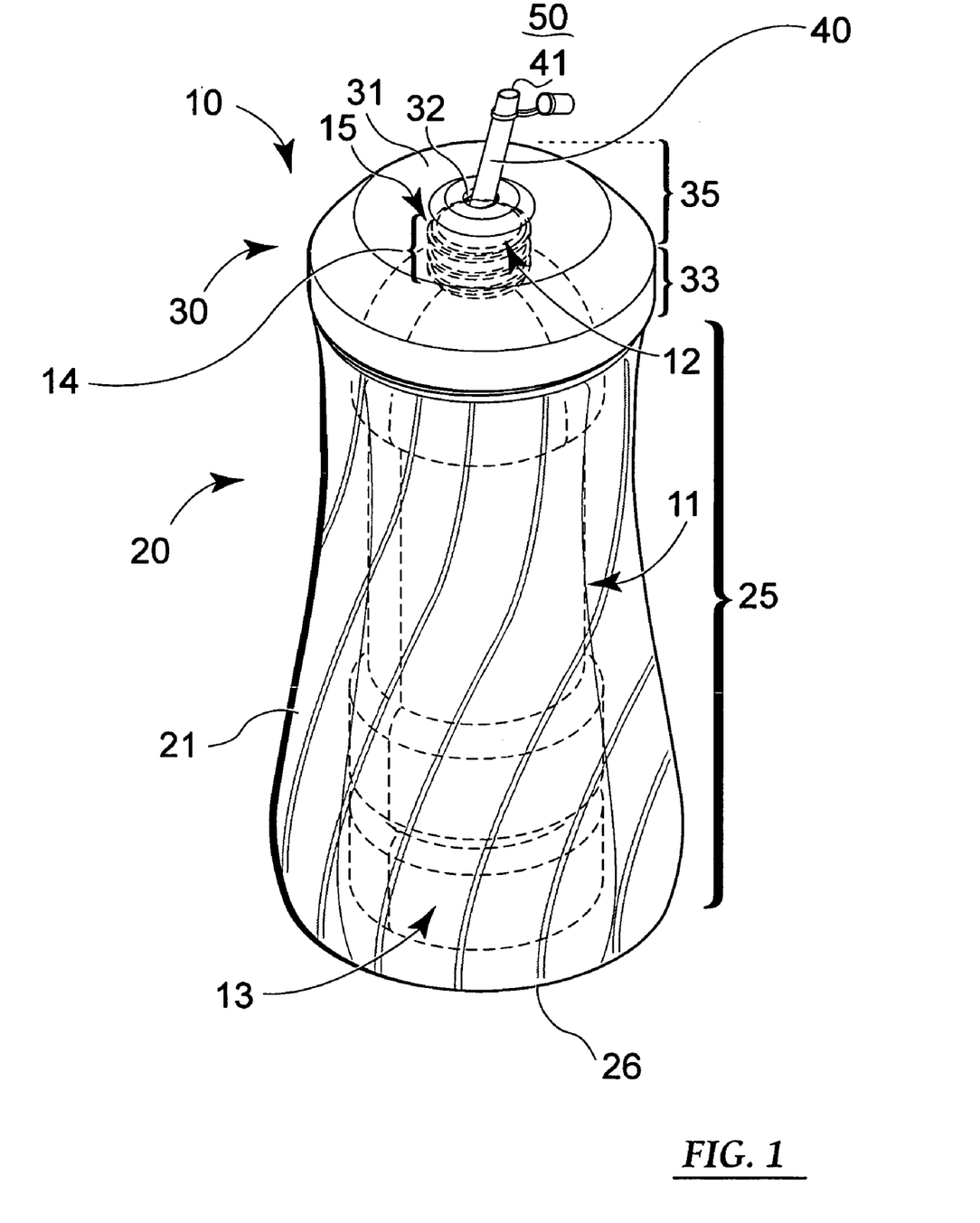
FIG. 1 is a perspective view of an embodiment of a first version of the appliance of the present invention, as viewed from the side of and above the appliance, with a bottle within the appliance being illustrated by phantom lines.
Figure 2:
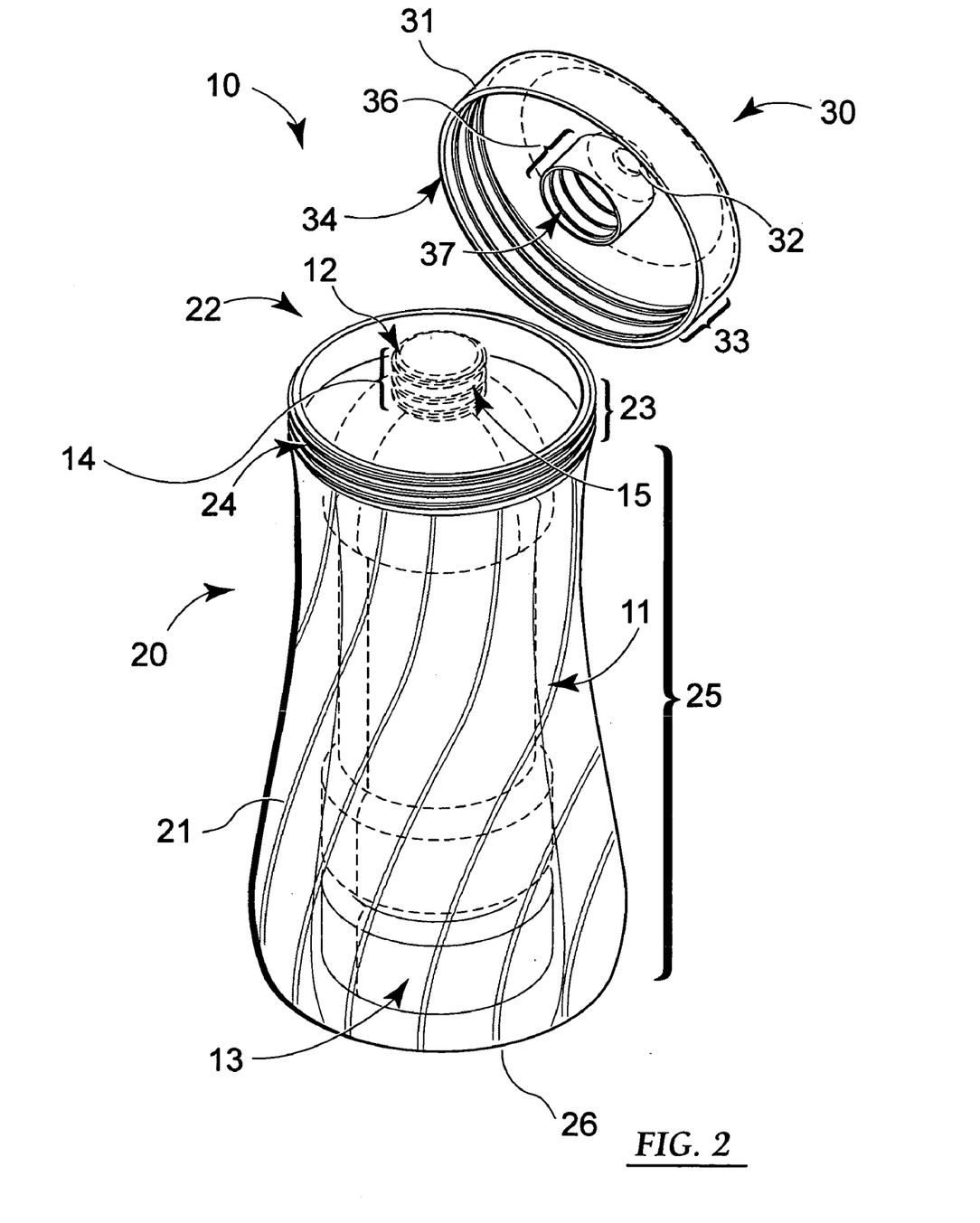
FIG. 2 is a perspective view of the embodiment of the first version of the appliance illustrated in FIG. 1, as viewed from the side of and above the appliance, with the cap member removed from the container member of the appliance and a bottle within the appliance being illustrated by phantom lines.

One embodiment of a first version of the present invention is illustrated in FIG. 1 and FIG. 2. In this embodiment, the appliance 10 may be used to hold a container, such as a bottle 11 having an opening 12 therein, which is shown in phantom lines in FIG. 1 and FIG. 2. It is to be noted that the bottle 11 is a part of the present invention in some embodiments of the appliance 10, but is not a part of the appliance 10 in all embodiments of the present invention. The appliance 10 of this embodiment is generally comprised of a container member 20, a cap member 30, bottle connecting means, which are described in more detail below, and cap member connecting means, which are described in more detail below. The container member 20 is generally comprised of a container body 21 having an opening 22 at one end of the container body 21. The cap member 30 is generally comprised of a cap body 31 having an opening 32 in the cap body 31. The bottle connecting means, which is described in more detail below, is used to removably connect the cap body 31 to the bottle 11 in a manner so that the opening 32 in the cap body 31 is in fluidic communication with the opening of the bottle 11. The cap member connecting means, which is described in more detail below, is used to removably connect the cap member 30 to the container member 20 in a manner so that the cap member 30 covers the opening 22 at one end of the container member 20 and so that the bottle 11 is positioned within the volume displaced by the container body 21 while the cap member 30 is removably connected to the container member 20.

In the embodiments of the present invention illustrated in FIG. 1, the appliance 10 further comprises a tubular member 40 that extends from a position within the interior volume 13 of the bottle 11 through the bottle opening 12 and the opening 32 in the cap body 31 to a position in an area 50 on the side of the cap member 30 opposite the bottle 11, so that the interior volume 13 of the bottle 11 is in fluidic communication by means of the tubular member 40 with such area 50 on the side of the cap member 30 opposite the bottle 11. In the embodiment illustrated in FIG. 1, the tubular member 40 has a cross-section that is cylindrical in shape. In other embodiments of the invention, the tubular member may have a cross-section of a different shape. For example the tubular member may have a cross-section comprising a square, a rectangle, a triangle, a hexagon, an ellipse, an octagon, or other shape, or a combination of such shapes. As illustrated in FIG. 1, the tubular member 40 preferably has a length adequate to extend from the area 50 above the cap member 30 to approximately the bottom of the container member 20. This length would allow for a user to place his or her lips on the top end 41 of the tubular member 40 and apply sufficient suction to the tubular member 40 to bring a liquid from the bottom of the container member 20 or the bottle 11, as appropriate, to the to top end 41 of the tubular member 40. The preferred inside diameter (or other inside dimensions) of the tubular member 40 is dependent upon the individual taste of the user, but the more preferred inside diameter (or other inside dimensions) of the tubular member 40 is in the range of one eighth inch to one half inch. The most preferred outside diameter of a cylindrical tubular member 40 is 0.355 to 0.365 inches with a wall thickness of 0.030 inches. The tubular member 40 may be constructed of any material currently known in the art or developed in the art in the future that is used to construct drinking straws. Examples of such materials include paper, polymers (such as polyethylene, polyvinyl chloride, polyester and styrene-butadiene copolymer), or combinations of such materials. The preferred material is dependent upon the liquids to be contained in the container member 20 or the bottle 11 and the individual taste of the user. The more preferred material for constructing the tubular member 40 is low density polyethylene. In other embodiments of the present invention, the appliance 10 also comprises tubular member connector means to removably connect the tubular member 40 to the cap member 30. In some of these embodiments, the tubular member connector means is comprised of the tubular member 40 having a cross-sectional shape and size approximately the same as the shape and size of the opening 32 in the cap body 31, so that the tubular member 40 may be slideably inserted into and removed from the opening 32 in the cap body 31. In such embodiments, the tubular member 40 is held in place within the opening 32 in the cap body 31 by friction. In other embodiments, the tubular member connector means may be comprised of an adhesive, glue or epoxy used to attach the tubular member 40 to the cap member 30. In still other embodiments, the tubular member 40 and the cap member 30 may be fabricated as a single component.

In the embodiment of the present invention illustrated in FIG. 1 and FIG. 2, the opening 22 at one end of the container body 21 is approximately circular in shape and the portion 23 of the container body 21 adjacent to such opening is approximately cylindrical in shape. In these embodiments, the cap body 31 is comprised of a bottom portion 33 approximately cylindrical in shape and the cylindrical portion 33 of the cap body 31 is of a size adapted to fit over and be removably connected to the cylindrical portion 23 of the container body 21 by being positioned adjacent to the cylindrical portion 23 of the container body 21. It is to be noted, however, that in other embodiments of the invention, the portion of the container member 20 adjacent to the opening 22 of the container body 21 and the portion of the cap member 30 adjacent to the opening 32 of the cap body 31 may have a shape other than circular. In addition, the portion of the cap member 30 adjacent to the opening 32 of the cap body 31 may be of a size adapted to fit within the portion of the container member 20 adjacent to the opening 22 of the container body 21. For example, such portions may both have the shape of an ellipse, a square or some other shape, and the portion of the cap member 30 adjacent to the opening 32 of the cap body 31 may be of a size adapted to fit into and be removably connected to the portion of the container member 20 adjacent to the opening 22 of the container body 21 by being positioned adjacent to the cylindrical portion 23 of the container body 21.

In the embodiment of the invention illustrated in FIG. 1 and FIG. 2, the cap member connecting means is comprised of threads 24 on the exterior surface of the cylindrical portion 23 of the container body 21 adjacent to the container body opening 22 and threads 34 on the interior surface of the bottom cylindrical portion 33 of the cap body 31. In these embodiments, the threads 24 on the container body 21 are of a size and structure adapted to receive the threads 34 on the cap body 31 so that the cap member 30 can be screwed onto the container member 20 by use of such threads 24, 34. In other embodiments of the invention, the cap member connecting means may be comprised of the cylindrical portion 33 of the cap body 31 having a size and shape approximately the same as the cylindrical portion 23 of the container body 21, so that the cap member 20 is held in place adjacent to the container member 20 by friction. In other embodiments of the invention, the cap member connecting means may be comprised of the cylindrical (or other shaped) portion 33 of the cap body 31 having a bead of flexible material on the external periphery of such portion 33 and the cylindrical (or other shaped) portion 23 of the container body 21 having a corresponding groove on its internal periphery, so that the cap member 20 is held in place adjacent to the container member 20 by means of such bead being held in place within such groove.

In the embodiment of the invention illustrated in FIG. 1 and FIG. 2, the cap body 31 is further comprised of a top portion 35 approximately circular in shape that is adjacent to one end of the bottom cylindrical portion 33 of the cap body 31, so that the top portion 35 of the cap body 31 entirely covers the opening 22 of the container body 21 while the cap member 30 is removably connected to the container member 20. In other embodiments of the invention, the top portion 35 of the cap body 30 have different shapes. For example, the top portion 35 of the cap body 31 may be hemispherical, conical, or another shape or combination of such shapes. The shape of the top portion 35 of the cap body 31 is dependent upon the taste of the user of the appliance 10 and other factors.

In the embodiment of the present invention illustrated in FIG. 1 and FIG. 2, the container body 21 is further comprised of a lower portion 25 adjacent to the approximately cylindrical portion 23 of the container body 21 that is adjacent to the opening 22 in the container body 21. In this embodiment, the lower portion 25 extends in a direction away from the approximately cylindrical portion 23 opposite the opening and symmetrically along a longitudinal axis that extends through the center of the cylindrical portion 23. Also in this embodiment, the lower portion 25 has a cross-section that is circular in shape, when viewed along the longitudinal axis of the lower portion 25, and such cross-section increases in diameter and then decreases in diameter as such cross-section is displaced longitudinally away from the approximately cylindrical portion 23 of the container body 21. In this embodiment, the distal end 26 of the lower portion 25 has a bottom surface that enables the container member 20 to rest on a flat surface when placed upon such surface. It is to be noted, however, that in other embodiments of the invention, the lower portion may have a shape different from that illustrated in FIG. 1 and FIG. 2. For example, in other embodiments, the lower portion 25 may be shaped as a cylinder, cone, ellipsoid, barrel, cube, block, polyhedron, paraboloid, rhombohedral, convex or concave curved shape, or other shape or combinations of such shapes as determined by the shape and size of the bottle 11 and the individual taste of the user of the appliance 10.

In the various embodiments of the invention, including the embodiment illustrated in FIG. 1 and FIG. 2, the length of the container member 20 along its longitudinal axis, as well as the other internal dimensions (such as diameter) of the container member 20 (as measured radially from such longitudinal axis), is dependent upon the size of the bottle 11 and the individual taste of the user of the appliance 10. In the embodiment illustrated in FIG. 1 and FIG. 2, the preferred length of the container member 20 along its longitudinal axis from the opening 22 of the container body 21 to the bottom surface 26 of the lower portion 25 of the container body 21 is in the range of from seven inches to twelve inches. In this embodiment, the cylindrical portion 23 of the container body 21 adjacent to the opening 22 of the container body 21 preferably has an inside diameter in the range of from two inches to four and one half inches. Also in this embodiment, the inside diameter of the cross-section of the bottom portion 25 of the container member 20 having the maximum diameter is preferably in the range of from two inches to six inches.

In the embodiment of the present invention illustrated in FIG. 1 and FIG. 2, the bottle 11 has a cylindrical portion 14 adjacent to the bottle opening 12 that has threads 15 on its exterior surface and the bottle connecting means, which is used to connect the bottle 11 to the cap member 20, is comprised of a cylindrical bottle holding portion 36 extending from a surface of the cap member 20, wherein the interior surface of such cylindrical bottle holding portion 36 has threads 37. In this embodiment, the threads 37 on the cylindrical bottle holding portion 36 are of a size and structure adapted to receive the threads 15 on the cylindrical threaded portion 14 of the bottle 11, so that the bottle 11 can be screwed onto the cap member 20. Also in this embodiment, where the cap body 31 is comprised of a top portion 35 approximately circular in shape, forming a cap-shaped cap member 20, and the cylindrical bottle holding portion 36 of the cap member 30 extends approximately perpendicular from the surface of the top portion 35 of the cap member 30 on the same side of the cap body 31 as the bottom cylindrical portion 33. It should be noted that to maintain the fluidic communication between the area 50 outside the appliance 10 with the volume within the bottle 11, the opening 32 in the cap body 31 is within the boundary of the cylindrical bottle holding portion 36 of the cap member 30.

The cap member 30 and the container member 20 may be constructed of any material currently known in the art or developed in the art in the future that is used to construct drinking containers. Examples of such materials include wood, paper, metals (such as aluminum), polymers (such as polyethylene, polyvinyl chloride, polyester), and styrene-butadiene copolymer, or combinations of such materials. The preferred material is dependent upon the liquids to be contained in the container member 20 or the bottle 11 and the individual taste of the user. The more preferred material for constructing the cap member 30 and the container member 20 is a styrene-butadiene copolymer, such as that sold under the trademark K-RESIN by Chevron Phillips Chemical Company LP. In some embodiments of the present invention, the lower portion 25 may be constructed of a thermally insulating material, such as light, resilient polystyrene foam (STYROFOAM), insulating ceramics, or other thermally insulating materials or combinations of such material. Alternatively, in other embodiments of the invention, the lower portion 20 may have a layer of thermally insulating material, such as light, resilient polystyrene foam (STYROFOAM), on its inner or outer surface or both. Preferably, the thermally insulating material is light, resilient polystyrene foam (such as STYROFOAM). In other embodiments of the invention, the appliance 10 may be constructed of a transparent material or may be of different colors or shades of the same color or combinations of such colors and shades. In yet other embodiments, the cap member 30 or the container member 20 or both may have printed or graphic indicia printed on a surface, attached to a surface, or incorporated in the materials comprising the appliance 10 that may be viewed from above a surface of the appliance 10. Such indicia may include trademarks, trade names, logos, symbols, slogans, promotional messages, personal messages, or other indicia or combinations of such indicia.

In some embodiments of the present invention, the appliance 10 is further comprised of the bottle 11. In such embodiments, the size and shape of the bottle 11 is dependent upon the individual tastes of the user of the appliance 10. Also in such embodiments, the bottle 11 may be constructed from the same materials used to construct the cap member 30 and the container member 20, as described above.

Figure 3A:
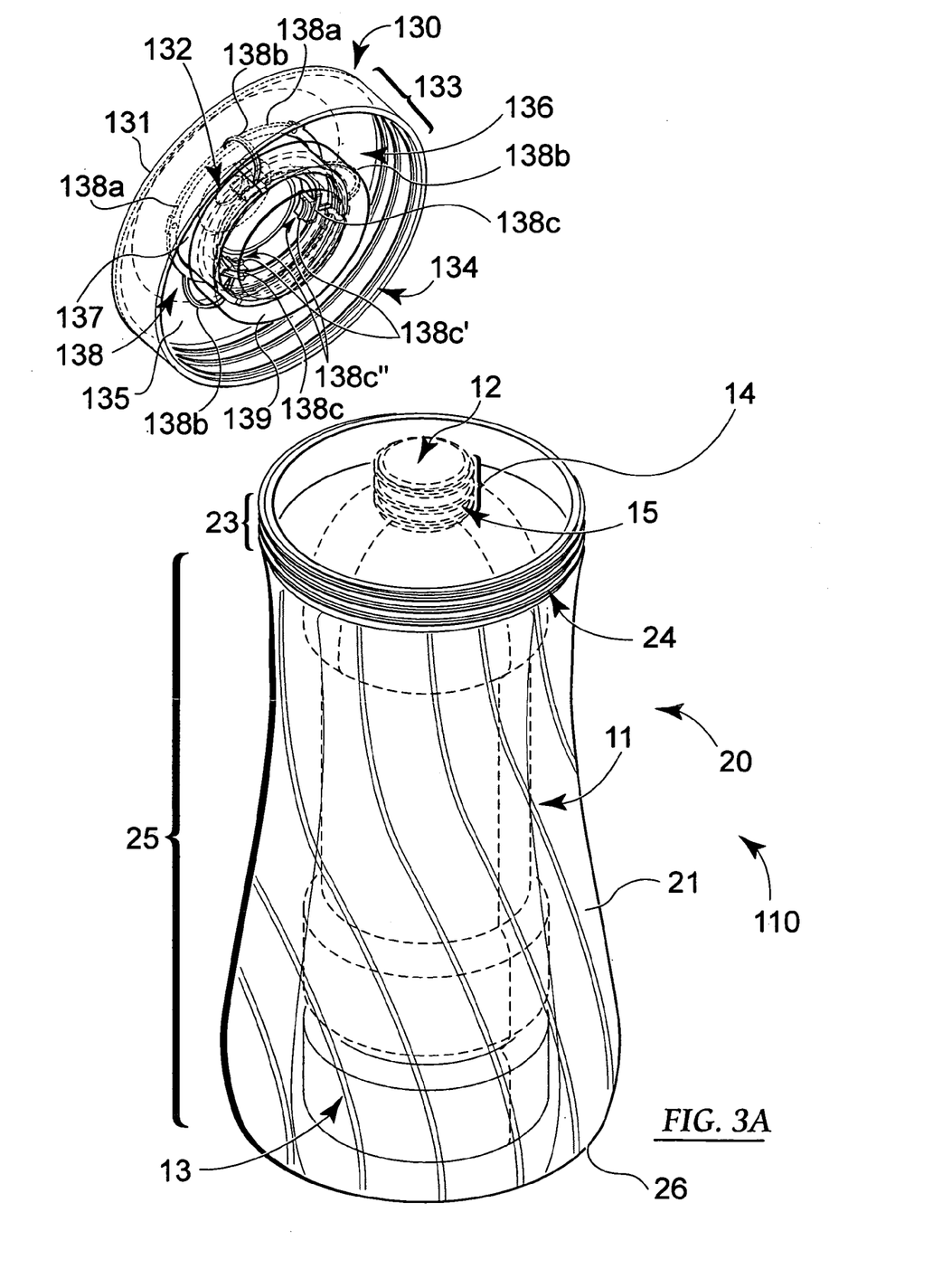
FIG. 3A is a perspective view of an embodiment of a second version of the appliance, as viewed from the side of and above the appliance, with the cap member removed from the container member of the appliance and a bottle within the appliance being illustrated by phantom lines.
Figure 3B:
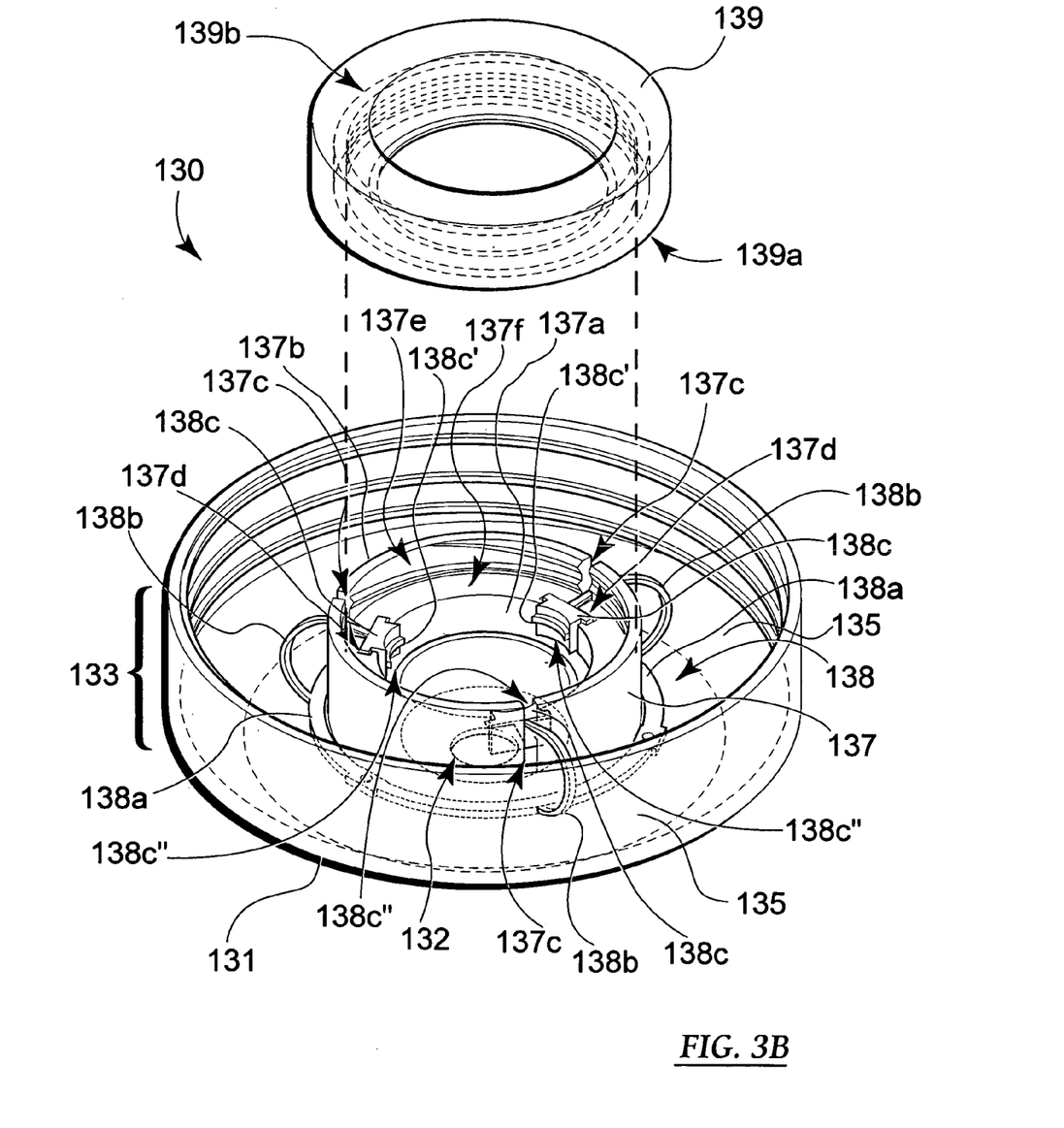
FIG. 3B is an enlarged, partially exploded perspective view of the cap member of the embodiment of the second version of the appliance illustrated in FIG. 3A, as viewed from the side of and above the surface of the cap member that is connected to the container member of the appliance.

An embodiment of a second version of the present invention is illustrated in FIG. 3A and FIG. 3B. In this embodiment of this second version, the container member 20 and the bottle 11 generally have substantially the same characteristics and features as the container member 20 and the bottle 11, respectively, of the embodiment of the first version of the invention illustrated and described above in connection with FIG. 1 and FIG. 2. In addition, in the embodiment of the second version of the invention illustrated in FIG. 3A and FIG. 3B, the cap member 130 generally has substantially the same characteristics and features as the cap member 30 of the embodiment of the first version of the invention illustrated and described above in connection with FIG. 1 and FIG. 2, except that the bottle connecting means of the cap member 130 illustrated in FIG. 3A and FIG. 3B is adjustable, so that it is capable of receiving and holding multiple bottles 11 having different sizes of bottle openings 12 and different types of thread 15 designs. In the embodiment of this second version of the present invention illustrated in FIG. 3A and FIG. 3B, the adjustable bottle connecting means is an adjustable connector 136, which is comprised of a tubular holding member 137, a tab assembly member 138, and a top locking member 139. In this embodiment, the tubular holding member 137 is approximately tubular in shape and is attached to and extends approximately perpendicularly from the surface of the approximately circular top portion 135 of the cap body 131 in a manner so that the opening 132 in the cap body 131 is within the area bounded by the end of the tubular holding member 137 adjacent to the cap body 131. Preferably, the inner portion 137*a* of the tubular holding member 137 adjacent to the cap body 131 has a smaller inside diameter than the remaining outer portion 137*b* of the tubular holding member 137. The outer portion 137*b* of the tubular holding member 137 has at least three grooves 137*c* extending longitudinally along the sides of the tubular holding member 137. In addition, there are at least three channels 137*d* positioned in the interior surface of the inner portion 137*a* of the tubular holding member 137. Each of the at least three grooves 137*c* extends from the end of the outer portion 137*b* to the distal end of one of the at least three channels 137*d* positioned in the inner portion 137*a*. The number of grooves 137*c* and channels 137*d* correspond to the number of tab portions 138*c* of the tab assembly member 138, as described in more detail below. In addition, the size and shape of each of the at least three channels 137*d* is such that one of the at least three tab portions 138*c* fits within it, as described in more detail below. The size and shape of each of the at least three grooves 137*c* is such that one tab holding portion 138*b* may be slideably inserted into the groove 137*c*, as described in more detail below. Further, in the embodiment of this second version of the invention illustrated in FIG. 3A and FIG. 3B, the outer portion 137*b* of the tubular holding member 137 has threads 137e on its interior surface. The tubular holding member 137 may be attached to the cap body 131 by adhesives, epoxies, or glues, or by heating and fusing the two together, or by casting or fabricating the two as a single piece, or by other appropriate means or combinations of all such means. Preferably, the tubular holding member 137 and the cap body 131 are fabricated as a single piece.

In the embodiment of this second version of the invention illustrated in FIG. 3A and FIG. 3B, the tab assembly member 138 is generally comprised of a tab assembly base portion 138a, at least three tab holding portions 138b, and at least three tab portions 138c. The tab assembly base portion 138a is approximately annular in shape and has an interior dimension that permits it to slide down the outer surface of the tubular holding member 137 until the tab assembly base portion 138a is seated adjacent to the cap body 131 and held in place adjacent to the outer surface of the tubular holding member 137. Each of the at least three tab holding portions 138b are attached at one end to the tab assembly base portion 138a and are attached at the other end to one of the at least three tab portions 138c. In other embodiments of this version of the invention, there may be more than three tab holding portions 138b and more than three tab portions 138c, but there is generally one tab holding portion 138b for each tab portion 138c. The number of tab holding portions 138b and tab portions 138c is dependent upon the type of bottle 11 to be removably connected to the adjustable connector 136, the type of threads 15 on the bottle 11, and the individual taste of the user of the appliance 110. The preferred number of tab holding portions 138b and tab portions 138c is three. The tab holding portions 138b are preferably each spaced an equal distance apart along the periphery of the tab assembly base portion 138a. In the embodiment of this second version of the invention illustrated in FIG. 3A and FIG. 3B, each of the at least three tab portions 138c has the shape depicted in FIG. 3A and FIG. 3B and is positioned in one of the at least three channels 137d in the inner portion 137a of the tubular holding member 137. The depth of each of the at least three channels 137d, as measured radially from the central longitudinal axis of the tubular holding member 137, is slightly more than the thickness of the at least three tab portions 138c, and the width of each of the at least three channels 137d, as measured perpendicular to such thickness approximately along the perimeter of the tubular holding member 137, is slightly greater than the width of each of the at least three tab portions 138c (as measured in the same direction), so that each of the at least three tab portions 138c is permitted to slide in the radial direction (from the longitudinal axis of the tubular holding member 137) while being held in place by the side and bottom surfaces of the channel 137d in which it is positioned. In addition, in this embodiment, each of the at least three tab portions 138c has at least one bead 138c' on its interior surface 138c''. In other embodiments of this second version of the invention, there may be more than one bead 138c'. The number of beads 138c' is dependent upon the type of bottle 11 to be removably connected to the adjustable connector 136, the type of threads 15 on the bottle 11, and the individual taste of the user of the appliance 110. The preferred number of beads 138c' is one. The tab assembly base portion 138a, the at least three tab holding portions 138b, and the at least three tab portions 138c may be attached to one another by adhesives, epoxies, or glues, or by heating and fusing the them together, or by casting or fabricating the them as a single piece, or by other appropriate means or combinations of all such means. Preferably, the tab assembly base portion 138a, the at least three tab holding portions 138b, and the at least three tab portions 138c are fabricated as a single piece.

In the embodiment of this second version of the invention illustrated in FIG. 3A and FIG. 3B, the top locking member 139 is also tubular in shape. In this embodiment, the surface 139a at the end of the top locking member 139 that is positioned adjacent to the tubular holding member 137 has an annular shaped top member channel 139b recessed into such surface 139a. The top member channel 139b has a width (measured radially from the longitudinal axis of the top locking member 139) adequate to permit the outer portion 137b of the tubular holding member 137 to fit into the top locking channel 139b in a manner so that the top holding member 139 is permitted to fit over and slide down the outer portion 137b of the tubular holding member 137 until the surface 139a of the top locking member 139 is adjacent to the top surface 137f of the inner portion 137a of the tubular holding member 137. Preferably, the interior diameter of the top locking member 139 is the same as the interior diameter of the inner portion 137a of the tubular holding member 137. In the embodiment of this second version of the invention illustrated in FIG. 3A and FIG. 3B, the interior surface of the top member channel 139b is also threaded, and such threads are of a size and shape adapted to receive the threads 137e on the interior surface of the outer portion 137b of the tubular holding member 137. In other embodiments of the invention, the top holding member 139 may be permanently or removably attached to the tubular holding member 137 using means other than threads. For example, the top locking member 139 may be permanently or removably attached to the tubular holding member 137 using adhesives, epoxies, screws, hook and loop fasteners, clamps, clips, clasps, pins, rivets, welds, and other fasteners or combinations of all such means and fasteners. By seating against the top surface 137f of the tubular holding member 137, the top locking member 139 is thus used to hold the at least three tab portions 138c in place in the at least three channels 138d in the tubular holding member 137.

In the embodiment of the second version of the invention illustrated in FIG. 3A and FIG. 3B, the adjustable connector 136 and its component parts may generally be constructed of the same material or materials as the cap member 30 of the first version of the invention illustrated and described above in connection with FIG. 1 and FIG. 2. Preferably, the adjustable connector 136 is constructed of the same material as the cap member 130. In the embodiment of this second version of the invention illustrated in FIG. 3A and FIG. 3B, the cylindrical portion 14 adjacent to the opening 12 of the bottle 11 is placed into the opening in the adjustable connector 136. In doing so, the cylindrical portion 14 adjacent to the opening 12 of the bottle 11 is placed against the interior surface 138c'' of each of the at least three tab portions 138c, which protrude slightly beyond the interior surface of the inner portion 137a of the tubular holding member 137 and the interior surface of the top holding member 139. As the cylindrical portion 14 of the bottle 11 is screwed into the adjustable connector 136, the bead 138c' of each of the at least three tab portions 138c engages the threads 15 on the cylindrical portion 14 of the bottle 11. As the bottle 11 is screwed further into the adjustable connector 136, the at least three tab portions 138c are forced radially outward and deeper into the at least three channels 137d in the inner portion 137b of the tubular holding member 137. Preferably, the interior diameter of the inner portion 137a of the tubular holding member 137 is between ½ inches and 2½ inches, and the exterior diameter of the opening 12

(including any threaded portion) in the bottle 11 is between ⅜ inches and 2½ inches. More preferably, the interior diameter of the inner portion 137a of the tubular holding member 137 is between one inch and 1⅛ inches, and the opening 12 (including any threaded portion) in the bottle 11 is between ⅞ inches and 1⅛ inches.

The present invention also includes a method of using the embodiment of the appliance 110 illustrated in FIG. 3A and FIG. 3B. This method is comprised of the follow steps. First, connecting the bottle 11 to the cap member 30 by screwing the adjustable bottle connector 136 of the cap member 30 to the threaded cylindrical portion 14 adjacent to the opening 22 of the bottle 11. Second, connecting the cap member 30 to the container member 20 by screwing the threaded cylindrical portion 23 of the container body 21 adjacent to the opening 22 at one end of the container body 21 to the threaded bottom cylindrical portion 33 of the cap member 30. And finally, inserting the tubular member 40 through the opening 32 in the cap member 30 and into the bottle 11.

What is claimed is:

1. An appliance for holding a bottle, the bottle having an opening therein, the appliance comprising:
   (a) a container member, comprised of a container body having an opening at one end of the container body;
   (b) a cap member, comprised of:
      (i) a cap body having an opening in the cap body; and
      (ii) adjustable bottle connecting means to removably connect the cap body to the bottle opening, wherein the opening in the cap body is in fluidic communication with the bottle opening;
   (c) cap member connecting means to removably connect the cap member to the container member, wherein the bottle is positioned within the volume displaced by the container body while the cap member is removably connected to the container member,
   wherein:
   (d) the bottle has a cylindrical portion adjacent to the bottle opening that is threaded on its exterior surface; and
   (e) the adjustable bottle connecting means is an adjustable connector comprised of:
      (i) a tubular holding member extending approximately perpendicular from a surface of the cap body, wherein:
         (A) the tubular holding member has at least three grooves therein extending approximately longitudinally from the end of the tubular holding member that is opposite from the cap body portion;
         (B) the tubular holding member has at least three channels therein that are positioned at the distal end of each of the at least three grooves; and
         (C) the opening in the cap body is within the surface of the cap body bounded by the end of the tubular holding member adjacent to the cap body;
      (ii) a tab assembly member comprised of:
         (A) a tab assembly base portion approximately annular in shape having an interior diameter adapted to fit over and slide down the outside surface of the tubular holding member;
         (B) at least three tab portions, wherein each of the at least three tab portions corresponds to one of the at least three grooves and at least three channels in the tubular holding member, and wherein each tab portion is positioned in one of the at least three channels; and
         (C) at least three tab holding portions, wherein each of the at least three tab holding portions corresponds to one of the at least three tab portions, and wherein each of the at least three tab holding portions connects one of the at least three tab portions to the tab assembly base portion;
      (iii) a top locking member having a surface approximately annular in shape of a size adapted to be positioned adjacent to the tubular holding member; and
      (iv) top locking connector means to connect the top locking member to the tubular holding member;
      (v) wherein the tubular holding member has an interior diameter of a size capable of receiving the cylindrical portion of the bottle so that when the cylindrical portion is screwed into the tubular holding member the threads of the exterior surface of the cylindrical portion of the bottle adjacent to the bottle opening are held in place by the tab portions.

2. The appliance of claim 1, wherein the top locking connector means is comprised of:
   (a) threads on the interior surface of the tubular holding member; and
   (b) a top member channel having an approximately annular shape recessed into the surface of the top locking member that is adjacent to the tubular holding member, wherein:
      (i) the top member channel is of a size adapted to fit over the end of the tubular holding member; and
      (ii) the top member channel has threads on its interior circumferential surface that are of a size and shape adapted to receive the threads on the interior surface of the tubular holding member.

3. The appliance of claim 1, wherein:
   (a) the tubular holding member has three grooves and three channels; and
   (b) the tab assembly member is comprised of three tab portions and three tab holding portions.

4. The appliance of claim 1, wherein each of the at least three tab portions is further comprised of at least one bead on the interior surface thereof.

5. The appliance of claim 1, wherein the interior diameter of the tubular holding member is between ½ inches and 2½ inches, and the outside diameter of the bottle opening is between ⅜ inches and 2½ inches.

6. The appliance of claim 5, wherein the interior diameter of the tubular holding member is between one inch and 1⅛ inches, and the outside diameter of the bottle opening is between ⅞ inches and 1⅛ inches.

7. The appliance of claim 1, wherein the cap member completely covers the opening at one end of the container member.

8. The appliance of claim 1, further comprising a tubular member, wherein the tubular member extends from a position in the interior volume of the bottle through the bottle opening and the opening in the cap body to a position in an area on the side of the cap member opposite the bottle, so that the interior volume of the bottle is in fluidic communication by means of the tubular member with such area on the side of the cap member opposite the bottle.

9. The appliance of claim 8, wherein the tubular member has a cross-section that is cylindrical in shape.

10. The appliance of claim 8, further comprising tubular member connector means to removably connect the tubular member to the cap member.

11. The appliance of claim 10, wherein the tubular member has a cross-section that is cylindrical in shape.

12. The appliance of claim 10, wherein the tubular member connector means is comprised of the tubular member having a cross-sectional shape and size approximately the same as the shape and size of the opening in the cap body, so that the tubular member may be slideably inserted into and removed from the opening in the cap body and the tubular member is held in place within the opening in the cap body by friction.

13. The appliance of claim 1, wherein the opening at one end of the container body is approximately circular in shape and the portion of the container body adjacent to such opening is approximately cylindrical in shape.

14. The appliance of claim 13, wherein the cap body is comprised of a bottom portion approximately cylindrical in shape and the bottom cylindrical portion of the cap body is of a size adapted to fit over and be removably connected to the cylindrical portion of the container body by being positioned adjacent to the cylindrical portion of the container body.

15. The appliance of claim 14, wherein the cap body is further comprised of a top portion approximately circular in shape that is adjacent to one end of the bottom cylindrical portion of the cap body opposite the container member.

16. The appliance of claim 14, wherein the cap member connecting means is comprised of:
  (a) threads on the exterior surface of the cylindrical portion of the container body adjacent to the opening at one end of the container body;
  (b) threads on the interior surface of the bottom cylindrical portion of the cap body;
  (c) wherein the threads on the cylindrical portion of the container body are of a size and structure adapted to receive the threads on the bottom cylindrical portion of the cap body.

17. The appliance of claim 14, wherein the container body is further comprised of a lower portion, such lower portion being adjacent to the approximately cylindrical portion of the container body adjacent to the opening opposite the opening.

18. The appliance of claim 14, wherein the lower portion is comprised of a polymer material.

19. The appliance of claim 18, wherein the container body is further comprised of a layer of thermally insulating material.

20. The appliance of claim 14, wherein the container body is constructed of a thermally insulating material.

21. The appliance of claim 20, wherein the thermally insulating material is polystyrene foam.

22. The appliance of claim 14, wherein the container body is further comprised of a lower portion, such lower portion being adjacent to the approximately cylindrical portion of the container body adjacent to the opening opposite the opening, wherein the lower portion has a cross-section that is circular in shape perpendicular to the longitudinal axis of the lower portion and such cross-section increases in diameter and then decreases in diameter as such cross-section is displaced from the approximately cylindrical portion of the container body, and wherein the distal end of the lower portion has a bottom surface that enables the container to rest on a flat surface when placed upon such surface.

23. The appliance of claim 22, wherein the length of the container member along its longitudinal axis from the opening of the container member to the bottom surface is in the range of from seven inches to twelve inches.

24. The appliance of claim 23, wherein the cylindrical portion of the container body adjacent to the opening at one end of the container body has an inside diameter in the range of from two inches to four and one half inches.

25. The appliance of claim 24, wherein the inside diameter of the lower portion of the container member having the maximum cross-section is in the range of from two inches to six inches.

26. The appliance of claim 1, further comprising the bottle.

27. An appliance for holding a bottle, the bottle having an opening therein, the appliance comprising:
  (a) a container member, comprised of a container body having an opening at one end of the container body, the container body being comprised of a cylindrical portion adjacent to the opening at one end of the container body, such cylindrical portion having threads on its exterior surface, and a lower portion adjacent to the cylindrical portion;
  (b) a cap member comprised of a cap body having an opening in the cap body, the cap body being comprised of:
    (i) a cap body, such cap body being further comprised of a circular shaped top portion having an opening therein and a bottom cylindrical portion adjacent to the top portion, wherein the bottom cylindrical portion has threads on its interior surface that are of a size and shape adapted to receive the threads on the exterior surface of the cylindrical portion of the container body; and
    (ii) an adjustable connector, such adjustable connector being further comprised of:
      (A) a tubular holding member extending approximately perpendicular from a surface of the top portion, wherein:
        (1) the tubular holding member has at least three grooves therein extending approximately longitudinally from the end of the tubular holding member that is opposite from the top portion;
        (2) the tubular holding member has at least three channels therein that are positioned at the distal end of each of the at least three grooves; and
        (3) the opening in the top portion of the cap body is within the surface of by the top portion bounded by the end of the tubular holding member adjacent to the top portion;
      (B) a tab assembly member comprised of:
        (1) a tab assembly base portion approximately annular in shape having an interior diameter adapted to fit over and slide down the outside surface of the tubular holding member;
        (2) at least three tab portions, wherein each of the at least three tab portions corresponds to one of the at least three grooves and at least three channels in the tubular holding member, and wherein each tab portion is positioned in one of the at least three channels; and
        (3) at least three tab holding portions, wherein each of the at least three tab holding portions corresponds to one of the at least three tab portions, and wherein each of the at least three tab holding portions connects one of the at least three tab portions to the tab assembly base portion;
      (C) a top locking member having a surface approximately annular in shape of a size adapted to be positioned adjacent to the tab holding member; and
      (D) top locking connector means to connect the top locking member to the tab holding member;

(E) wherein the tubular holding member has an interior diameter of a size capable of receiving the cylindrical portion of the bottle so that when the cylindrical portion is screwed into the adjustable connector the threads of the exterior surface of the cylindrical portion of the bottle adjacent to the bottle opening are held in place by the tab portions; and (c) a tubular member, wherein the tubular member extends from a position in the interior volume of the bottle through the bottle opening and the opening in the top portion of the cap body to a position in an area on the side of the cap member opposite the bottle, so that the interior volume of the bottle is in fluidic communication by means of the tubular member with such area on the side of the cap member opposite the bottle.

28. A method of using the appliance of claim 27, comprising the steps of:

(a) connecting the bottle to the cap member by screwing the adjustable connector of the cap body to the threaded cylindrical portion adjacent to the bottle opening;

(b) connecting the cap member to the container member by screwing the threaded cylindrical portion of the container body adjacent to the opening at one end of the container body to the threaded bottom cylindrical portion of the cap member; and (c) inserting the tubular member through the opening in the cap member and into the bottle.

* * * * *